United States Patent [19]

Tsuchino et al.

[11] Patent Number: 4,752,557
[45] Date of Patent: Jun. 21, 1988

[54] METHOD OF RADIPHOTOGRAPHY USING LIGHT-STIMULABLE RADIATION IMAGE STORAGE PANEL

[75] Inventors: Hisanori Tsuchino; Manami Teshima; Hiroshi Takeuchi; Fumio Shimada, all of Hino, Japan

[73] Assignee: Konishiroku Photo Industry Co., Ltd., Tokyo, Japan

[21] Appl. No.: 829,466

[22] Filed: Feb. 12, 1986

Related U.S. Application Data

[63] Continuation of Ser. No. 604,054, Apr. 26, 1984, abandoned.

[30] Foreign Application Priority Data

Apr. 30, 1983 [JP] Japan ................................. 58-77220

[51] Int. Cl.$^4$ ............................ G03C 1/00; G01J 1/58; H05B 33/00
[52] U.S. Cl. ..................................... 430/496; 430/945; 250/483.1; 250/414.1
[58] Field of Search .......................... 250/483.1, 484.1; 430/945, 496

[56] References Cited

U.S. PATENT DOCUMENTS

| | | | |
|---|---|---|---|
| 2,882,413 | 4/1959 | Vingerhoets | 250/483.1 |
| 3,344,276 | 9/1967 | Balding | 250/484.1 |
| 3,852,131 | 12/1974 | Houston | 156/3 |
| 3,859,527 | 1/1975 | Luckey | 250/327 |
| 4,239,968 | 12/1980 | Kotera et al. | 250/327.1 |
| 4,362,806 | 12/1982 | Whitmore | 430/202 |
| 4,368,390 | 1/1983 | Takahashi et al. | 250/363 R |
| 4,489,239 | 12/1984 | Grant et al. | 250/339 |
| 4,585,944 | 4/1986 | Teraoka | 250/484.1 |
| 4,621,196 | 11/1986 | Arakawa | 250/483.1 |

FOREIGN PATENT DOCUMENTS

| | | |
|---|---|---|
| 1308672 | 2/1973 | United Kingdom . |
| 1380186 | 1/1975 | United Kingdom . |
| 1444161 | 7/1976 | United Kingdom . |

Primary Examiner—John E. Kittle
Assistant Examiner—Patrick Ryan
Attorney, Agent, or Firm—Frishauf, Holtz, Goodman & Woodward

[57] ABSTRACT

A radiation image storage panel having a stimulable phosphor layer provided on a substrate with a honeycomb structure constituted of a number of cells partitioned by wall members filled with the stimulable phosphor is prepared by forming the substrate for phosphor layer by casting in a mother mold or etching of the substrate and filling the cells on the substrate with the stimulable phosphor. This radiation image storage panel can give images of markedly improved sharpness.

20 Claims, 5 Drawing Sheets (a)

(b)

METHOD OF RADIPHOTOGRAPHY USING LIGHT-STIMULABLE RADIATION IMAGE STORAGE PANEL

This application is a continuation of application Ser. No. 604,054, filed Apr. 26, 1984 now abandoned.

BACKGROUND OF THE INVENTION

This invention relates to a radiation image storage panel using a stimulable phosphor, and more particularly to a radiation image storage panel capable of providing an image of high sharpness and methods for preparing the same.

In the prior art, the so called radiophotography employing a silver salt for obtaining radiation images has been utilized. In recent years, particularly on account of the problem of exhaustion of silver resources on a global scale, it would be more desirable to picturize radiation images without recourse to a silver salt.

As the substitute method for the above radiophotography, there is proposed the method in which radiation transmitted through an object to be photographed is absorbed in a phosphor, and then exciting the phosphor with a certain kind of energy to permit the radiation energy stored in the phosphor to be radiated as luminescence, which luminescence is in turn detected to produce an image. More specifically, for example, U.S. Pat. No. 3,859,527 and Japanese Unexamined Patent Publication No. 12144/1980 propose a radiation image storage method in which a stimulable phosphor is used as the phosphor and electromagnetic radiation selected from visible light and IR-rays is used as the excitation energy. This storage method employs a panel having a stimulable phosphor layer formed on a support and obtains an image corresponding to the intensity of light by storing radiation energy corresponding to the intensity of the radiation transmitted through an object to be photographed in the stimulable phosphor layer of the panel and then scanning the stimulable phosphor layer with a stimulable excitation ray (hereinafter called merely as "excitation ray") thereby to take out the stored radiation energy as signals of light. The final images may be reproduced as a hard copy or reproduced on a CRT.

As is well known in the art, sharpness of the image in the radiophotography of the prior art is determined depending on spreading of momentary emission (emission on irradiation of radiation) of the phosphor in the screen. In contrast, sharpness of the image in the radiation image storage method utilizing a stimulable phosphor as described above is not determined by spreading of the stimulated emission of the phosphor in the radiation image storage panel, namely spreading of emission of the phosphor as in the case of radiophotography, but determined depending on spreading of the excitation ray within the panel. For, according to the radiation image storage method, the radiation image information stored in the radiation image storage panel is taken out sequentially, and therefore the stimulated emission by the excitation ray irradiated at a certain period of time ($t_i$) is collected desirably wholly and recorded as the output from a certain image element ($x_i$, $y_i$) on the panel on which the excitation ray is irradiated; if the excitation ray is spread through scattering, etc. within the panel to excite the phosphor existing outside of the irradiated image element, an output from a wider region than the image element is recorded as the output of the above image element ($x_i$, $y_i$). Accordingly, provided that the stimulated emission by the excitation ray irradiated at a certain period of time ($t_i$) is only the emission from the image element ($x_i$, $y_i$) on the panel on which the excitation ray is directly irradiated, sharpness of the image obtained will not be influenced by the emission regardless of the extent of spreading thereof.

The radiation image storage panel to be used in the radiation image storage method as described above has at least a phosphor layer comprising a stimulable phosphor. The phosphor layer is generally provided on an appropriate substrate. Further, as a usual practice, a protective layer for protecting physically or chemically the phosphor layer is provided on the layer surface on the side opposite to the surface to be contacted with the substrate. In such a radiation image storage panel of the prior art, the mean free path of the excitation ray within the phosphor layer will be elongated by scattering, etc. of the excitation ray, whereby the excitation ray is spread relatively greatly within the phosphor layer to be disadvantageously deteriorated markedly in sharpness, and improvement of this drawback is strongly desired.

As the methods for improvement of sharpness of the radiation image storage device, there have been known the method in which white powder is incorporated in the phosphor layer of the radiation image storage panel, as disclosed in Japanese Unexamined Patent Publication No. 146447/1980, and the method in which the radiation image storage panel is colored so that the mean reflectance in the exicited wavelength region of the stimulable phosphor is smaller than the mean reflectance in the stimulation emission wavelength region of the stimulable phosphor as disclosed in Japanese Unexamined Patent Publication No. 163500/1980. However, these methods are not satisfactory, because improvement of sharpness will necessarily result in marked lowering in sensitivity.

SUMMARY OF THE INVENTION

This invention has been accomplished in view of the drawbacks as described above of the radiation image storage panel employing a stimulable phosphor, and an object of this invention is to provide a radiation image storage panel capable of providing images of high sharpness and methods for preparation thereof.

We have made extensive studies on the radiation image storage panel employing a stimulable phosphor. As a consequence, in accordance with this invention, the radiation image storage panel which can accomplish the object as mentioned above is constituted of a radiation image storage panel having a stimulable phosphor layer wherein the stimulable phosphor is filled into respective cells in a honeycomb structure comprising a number of cells partitioned by partitioning wall members.

BRIEF DESCRIPTION OF THE DRAWINGS

The present invention may be better understood with referance to the accompanying drawings, in which.

Figure 3:
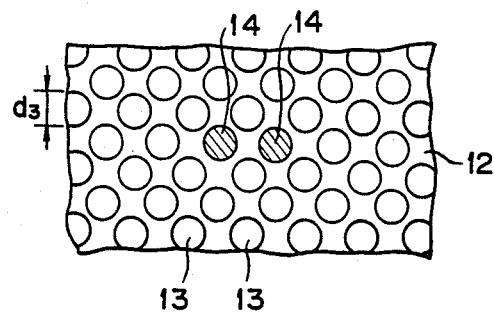
FIGS. 3 and 13 are plan view of another embodiments of this invention.
Figure 5:
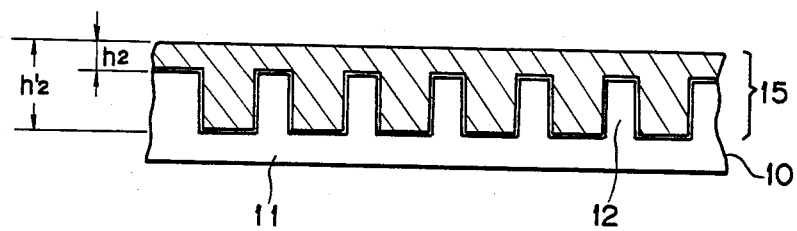
Figure 6:
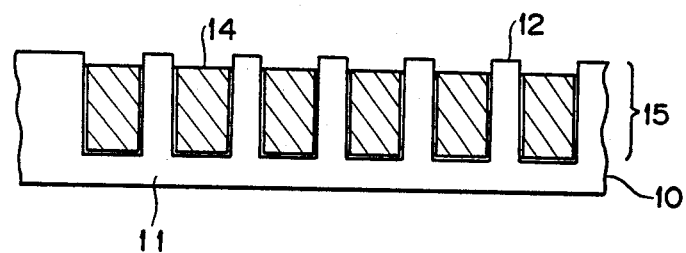
Figure 7:
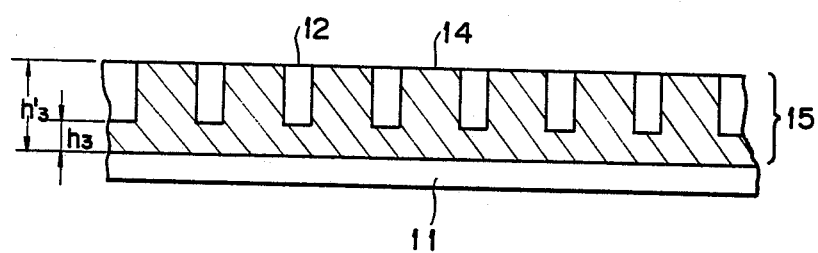
Figure 8:
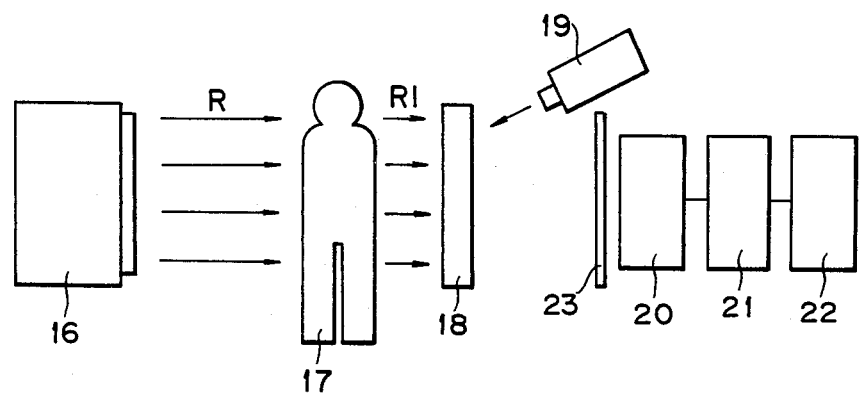
Figure 9:
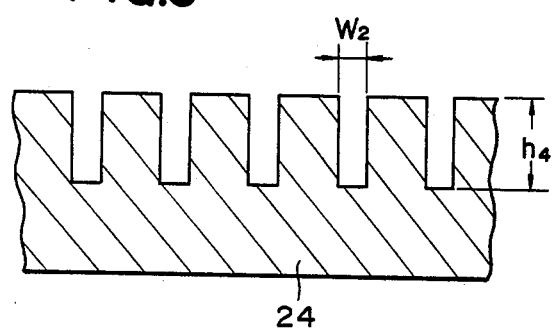
Figure 10:
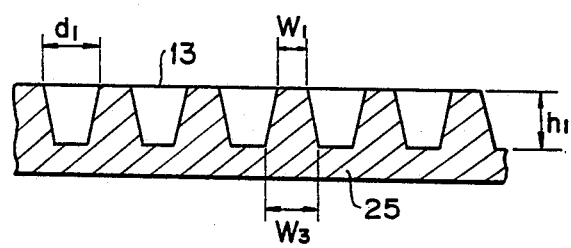
Figure 11:
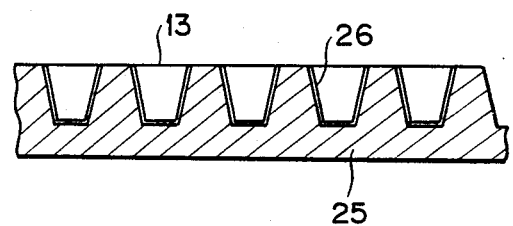
Figure 12:
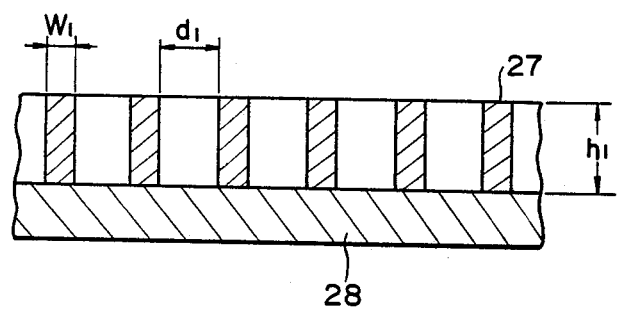

4(b) is a chart showing the characteristics of the radiation image storage panel of this invention;

FIGS. 5 through 7 are sectional views showing other embodiments of this invention, respectively;

FIG. 8 is a schematic chart for illustration of the radiation image information recording method with the use of the radiation image storage panel of this invention;

FIG. 9 is a sectional view of a mother mold to be used for preparation of the substrate for the radiation image storage panel shown in FIG. 3;

FIG. 10 is a sectional view of the substrate prepared by use of a photosensitive resin;

FIG. 11 is a sectional view of the substrate having a reflection layer provided thereon; and FIG. 12 is a sectional view of the substrate prepared by use of a metallic plate.

DESCRIPTION OF PREFERRED EMBODIMENTS

Figure 1:
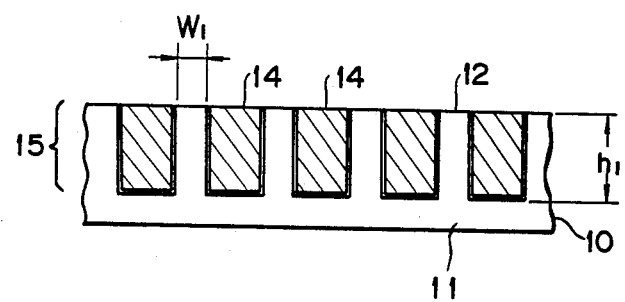
FIG. 1 is a partial sectional view of an embodiment of the radiation image storage panel of this invention.
Figure 2:
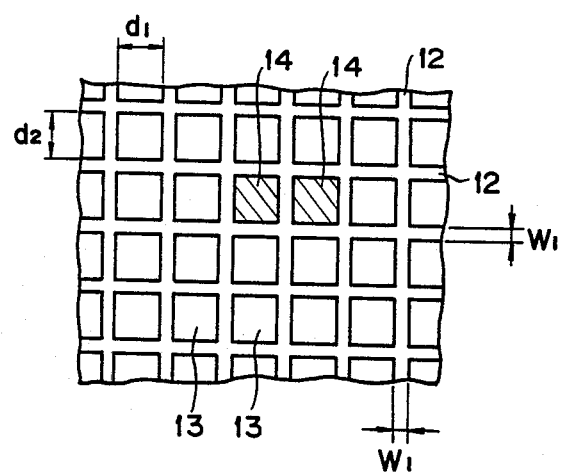
FIG. 2 is a plan view of FIG. 1.
Figure 13:
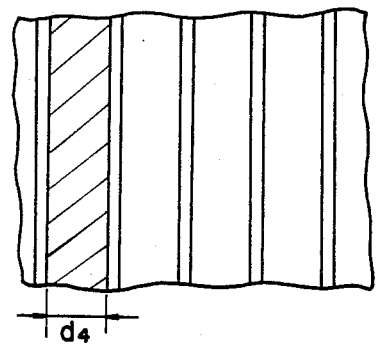

FIG. 1 and FIG. 2 show an embodiment of the radiation image storage panel of this invention. 10 is a phosphor layer substrate. This substrate 10 is constituted of a bottom portion 11 and a partitioning member 12. The bottom portion 11 is not essentially required, but it is provided for the purpose of avoiding deformation of the partitioning member 12. Therefore, if the partitioning member 12 has a sufficiently great strength, no such bottom portion 11 is necessary. The partitioning wall has a structure as shown in FIG. 2, in which a large number of partitioning members are crossed over each other to form a large number of cells 13. The form of the cells 13 is not limited to that as shown in FIG. 2, but it may be circular as shown in FIG. 3 or any other shape such as hexagonal shape, rectangular shape and elliptical shape may be also employed. And it may be a groove as shown in FIG. 13. The arrangement of cells 13 is not also limited to that as shown in FIG. 2, but the arrangement as shown in FIG. 3 may be also available. Any other desired arrangement may be available, provided that divided cells can be provided thereby. For prevention of moire, the shapes of the cells and/or arrangement of the cells should preferably be made random. Each of these cells is filled with a stimulable phosphor 14 to form a phosphor layer. The partitioning member 12 is preferably absorptive or reflective relative to the excitation ray and more preferably reflective for improvement of sensitivity. The bottom portion 11 may also be transmissive relative to the excitation ray. The partitioning member 12 may be preferably made of a material which can absorb or reflect the excitation ray or made by forming a layer absorbing or reflecting excitation ray thereon by means of coating or vapor deposition.

The substrate 10 may be transmissive, absorptive or reflective of emission from the stimulable phosphor 14, but it is preferably reflective to emission for improvement of luminance. For making the substrate absorptive or reflective relative to emission, the substrate may be made of a material absorptive or reflective of emission, or made by forming a layer absorbing or reflecting emission by means of coating or vapor deposition.

In the radiation image storage panel having such a constitution, the excitation ray for releasing the radiation energy stored in the stimulable phosphor 14 as the stimulated emission will proceed in all directions due to scattering, etc. and the excitation ray directed to the partitioning member 12 is absorbed (when the partitioning member is absorptive of the excitation ray) or reflected (when the partitioning member is reflective of the excitation ray). Also, the excitation ray directed to the bottom portion 1 will be absorbed (when the bottom portion material is absorptive of the excitation ray) in the bottom portion, reflected (when the bottom portion material is reflective of the excitation ray) by the bottom portion or transmitted (when the bottom portion material is transmissive of the excitation ray) through the bottom portion.

Figure 4:
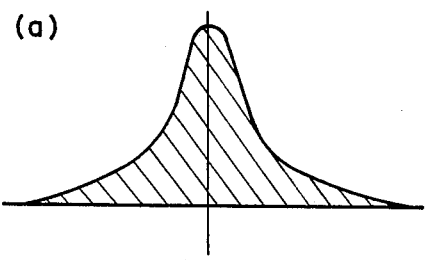
FIG. 4(a) is a chart showing the characteristics of the radiation image storage panel of the prior art and FIG.
Figure 4:
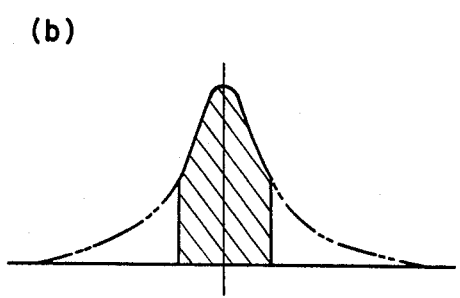

Accordingly, in spreading of the excitation ray irradiated on one point on the radiation image storage panel as shown in FIG. 4, the skirts of spread are cut off by the partitioning member 12 to give a radiation image with good sharpness.

The dimensions of the portion filled with a stimulable phosphor may be determined approximately with an aim to improve the image quality required for the radiation image storage panel employing a stimulable phosphor better than that of the prior art. A ratio of cell area in the top surface of the partitioning wall members is preferably 50% or more. It is preferable that cells have not more than 600 μm across in the top surface of the partitioning wall. More specifically, as a measure, $d_1$, $d_2$, $d_3$ and $d_4$ may be made 10 μm to 600 μm, and the depth $h_1$ about 30 μm to 1000 μm, whereby improved performance as compared with the radiation image storage panel of the prior art employing a stimulable phosphor can be obtained. The thickness of the partitioning wall $W_1$ is preferably as thin as possible but in general may be made 10 to 300 μm in view of preparation.

In the radiation image storage panel of this invention, even when the stimulable phosphor may be deposited higher than the partitioning wall member 12 to give an appearance of the phosphor uniformly formed as shown in FIG. 5, provided that the height $h_2$ from the top of the partitioning wall 12 is small (for example, in case $h_2$ is not more than $0.4 \times h'_2$ wherein $h'_2$ represents the height from the bottom portion), an effect of improved image quality similar to the case as shown in FIG. 1 can be obtained, although the image quality is slightly inferior as compared with the case of FIG. 1 wherein the surface of the upper face of the partitioning wall and the surface of stimulable phosphor are on the same level. Also, even in the case when the surface of the stimulable phosphor 14 is lower than the upper face of the partitioning wall 12 as shown in FIG. 6, an effect of improved image quality can be obtained similarly as in the case of FIG. 1.

Further, in the case of a panel having a structure as shown in FIG. 7, wherein a partitioning wall member 12 is provided on a stimulable phosphor layer with a uniform height of $h_3$ and the respective cells are filled with the stimulable phosphor, an effect of improved image quality can be obtained similarly as in the case of FIG. 1 (for example, in case $h_3$ is not more than $0.9 \times h'_3$ wherein $h'_3$ represents the height of the partitioning wall member 12). In this case the partitioning wall member 12 is separate from the bottom portion 11 different from the case of the panel shown in FIG. 1.

As the material to be used for the substrate for the phosphor layer of the radiation image storage panel in this invention, there may be employed various materials, such as various polymeric materials, glass, wool, cotton, paper, metals, etc., but they are not limitative of this invention. The substrate 10 for the phohsphor layer need not be made of one kind of material, but it may also be made of two or more kinds of materials. These substrates 10 for the phosphor layer may also have a subbing layer with adhesiveness to the phosphor on the face contacted with the phosphor within the cells, in order to hold more firmly the phosphor layer. When the substrate, in particular the bottom portion, for the phosphor layer employed is transmissive of the excitation ray, it is rendered possible to irradiate the radiation image storage panel with the excitation ray from the face on the opposite side to the face on which the phosphor layer is provided.

The material to be used for the partitioning wall member may include various polymeric materials, glass, ceramic and metals, etc. Further, when the material itself is transparent, pigments or dyes in amount to make these materials opaque to the excitation ray or emitted light, may be contained in the material or opaque coated films may be provided on the inner walls of cells by vapor deposition or other means. The inner walls may further be subjected to mirror finishing by vapor deposition or chemical means to form reflective surfaces. Thus, there is no particular restriction with respect to the material for the partitioning wall member, only if the strength of the partitioning wall member during filling of the cells with the stimulable phosphor is taken into consideration. The stimulable phosphor to be used for the radiation image storage panel of this invention is a phosphor which exhibits stimulated emission by irradiation of excitation ray after irradiation of radiation as previously mentioned. From substantial aspect, it is preferably a phosphor exhibiting stimulated emission by the excitation ray with wavelengths of 500 to 800 $\mu$m. As the stimulable phosphor to be used in the radiation image storage panel of this invention, there may be included, for example, a phosphor represented by $BaSO_4:Ax$ (wherein A is at least one kind of Dy, Tb and Tm, and x is $0.001 \leq x < 1$ mole %) as disclosed in Japanese Unexamined Patent Publication No. 80487/1973; a phosphor represented by $MgSO_4:Ax$ (wherein A is at least one kind of Ho and Dy, and x is $0.001 \leq x < 1$ mole %) as disclosed in Japanese Unexamined Patent Publication No. 80488/1973; a phosphor represented by $SrSO_4:Ax$ (wherein A is at least one kind of Tm, Tb and Dy, and x is $0.001 \leq x < 1$ mole %) as disclosed in Japanese Unexamined Patent Publication No. 80489/1973; a phosphor in which at least one kind of Mn, Dy and Tb is added to $Na_2SO_4$, $CaSO_4$, $BaSO_4$ and the like as disclosed in Japanese Unexamined Patent Publication No. 29889/1976; a phosphor such as of BeO, LiF, $Mg_2SO_4$ and $CAF_2$ as disclosed in Japanese Unexamined Patent Publication No. 30487/1977; a phosphor of $Li_2B_4O_7$:Cu,Ag, etc. as disclosed in Japanese Unexamined Patent Publication No. 39277/1978; a phosphor such as $Li_2O.(B_2O_2)x$:Cu (where x is $2 < x \leq 3$) and $Li_2O.(B_2O_2)x$:Cu,Ag (where x is $2 < x \leq 3$) as disclosed in Japanese Unexamined Patent Publication No. 47883/1979; a phosphor represented by SrS:Ce,Sm, SrS:Eu,Sm, $La_2O_2S$:Eu, Sm and (Zn,Cd)S:Mn,X (where X is a halogen) as disclosed in U.S. Pat. No. 3,859,527; ZnS:Cu,Pb phosphor, a barium aluminate phosphor of the formula $BaO.xAl_2O_3$:Eu (where x is $0.8 \leq x \leq 10$) and an alkaline earth metal silicate type phosphor of the formula $M^{II}O.xSiO_2$:A (where $M^{II}$ is Mg, Ca, Sr, Zm, Cd or Ba, A is at least one kind of Ce, Tb, Eu, Tm, Pb, Tl, Bi and Mn, and x is $0.5 \leq x \leq 2.5$), as disclosed in Japanese Unexamined Patent Publication No. 12142/1980; an alkaline $(Ba_{1-x-y}Mg_xCa_y)FX:eEu^{2+}$ (where X is at least one of Br and Cl, x, y and e are numbers satisfying the conditions of $0 < x+y \leq 0.6$, $xy \neq 0$ and $10^{-6} \leq e \leq 5 \times 10^{-2}$, respectively) as disclosed in Japanese Unexamined Patent Publication No. 12143/1980; a phosphor of the formula:LnOX:xA (where Ln represents at least one of La, Y, Gd and Lu, X represents Cl and/or Br, A represents Ce and/or Tb, and x represents a number staifying $0 < x < 0.1$) as disclosed in Japanese Unexamined Patent Publication No. 12144/1980; a phosphor of the formula: $(Ba_{1-x}M^{II}x)FX:yA$ (where $M^{II}$ represents at least one of Ma, Ca, Sr, Zn and Cd, X represents at least one of Cl, Br and I, A represents at least one of Eu, Tb, Ce, Tm, Dy, Pr, Ho, Nd, Yb and Er, x and y are numbers satisfying the conditions of $0 \leq x \leq 0.6$ and $0 \leq y \leq 0.6$) as disclosed in Japanese Unexamined Patent Publication No. 12145/1980; a phosphor of the formula: BaFX,x-Ce,yA (where X is at least one of Cl, Br and I, A is at least one of In, Tl, Gd, Sm and Zr, x and y are $0 < x \leq 2x10^{-1}$ and $0 < y \leq 5 \times 10^{-2}$, respectively) as disclosed in Japanese unexamined Patent Publication No. 84389/1980; a phosphor of divalent metal fluorohalide activated with a rare earth element of the formula: $M^{II}FX$: xA:yLn (where $M^{II}$ is at least one kind of Ba, Ca, Sr, Mg, Zn and Cd, A is at least one kind of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, Ln is at least one of Eu, Tb, Ce, Tm, Dy, Pr, Ho, Nd, Yb, Er, Sm and Gd, X is at least one of Cl, Br and I, x and y are numbers satisfying the conditions of $5 \times 10^{-5} \leq x \leq 0.5$ and $0 < y \leq 0.2$) as disclosed in Japanese Unexamined Patent Publication No. 160078/1980; a phosphor of the formula ZnS:A, CdS:A, (Zn, Cd)S:A, ZnS:A,X and CdS:A,X (where A is Cu, Ag, Au or Mn and X is a halogen); a phosphor of the formula [I] or [II] as disclosed in Japanese Patent Application No. 148285/1982:

$$xM_3(PO_4)_2.NX_2:yA \qquad \text{Formula [I]}$$

$$M_3(PO_4)_2:yA \qquad \text{Formula [II]}$$

(wherein M and N each represents at least one kind of Mg, Ca, Sr, Ba, Zn and Cd, X represents at least one kind of F, Cl, Br and I, A represents at least one kind of Eu, Tb, Ce, Tm, Dy, Pr, He, Nd, Yb, Er, Sb, Tl, Mn and Sn, and x and y are numbers satisfying $0 < x \leq 6$ and $0 \leq y \leq 1$, respectively); and a phosphor of the formula [III] or [IV]:

$$nReX_3.mAX_2':xEu \qquad \text{Formula [III]}$$

$$nReX_3. mAX_2':xEu.ySm \qquad \text{Formula [IV]}$$

(wherein Re represents at least one kind of La, Gd, Y and Lu, A represents at least one kind of alkaline earth metals, Ba, Sr and Ca, X and X' represent at least one kind of F, Cl and Br, x and y are numbers satisfying the conditions of $1 \times 10^{-4} < x < 3 \times 10^{-1}$, $1 \times 10^{-4} < y < 1 \times 10^{-1}$, and n/m satisfies the condition of $1 \times 10^{-3} < n/m < 7 \times 10^{-1}$).

However, the phosphor to be used in the radiation image storage method according to this invention is not limited to the phosphors as mentioned above, but any phosphor may of course be available, provided that it can exhibit stimulated emission when irradiated with excitation ray after it is irradiated with a radiation.

The stimulable phosphor to be employed may have a mean grain size which may be chosen suitably within the range of from 0.1 to 100 μm in view of the sensitivity of the radiation image storage panel and graininess of the phosphor. More preferably, a phosphor with a mean grain size of 1 to 30 μm may be used. However, it is not preferred to use a grain size greater than the cells.

In the radiation image storage panel of this invention, the stimulable phosphor as described above is generally dispersed in a suitable binder and filled into the cells. As the binder, there may be employed binders conventionally used for layer formation, including, for example, proteins such as gelatin, polysaccharides such as dextran, gum arabic, polyvinyl butyral, polyvinyl acetate, nitrocellulose, ethyl cellulose, vinylidene chloride-vinyl chloride copolymer, polymethyl methacrylate, vinyl chloride-vinyl acetate copolymer, polyurethane, cellulose acetate butyrate, polyvinyl alcohol and others. More preferably, a polyvinyl acetal resin shown by the following formula may be employed.

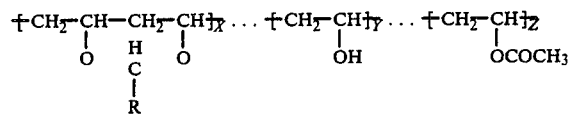

where R represents a lower alkyl group; and X, Y and Z are integral numbers which satisfy the following formulas.

$$0.40 < X/(X+Y+Z) < 0.79$$

$$0.20 < Y/(X+Y+Z) < 0.54$$

$$0 < Z/(X+Y+Z) < 0.20$$

$$100 < X+Y+Z < 3000$$

The polyvinyl acetal resin is a copolymer composed of vinyl acetal, vinyl alcohol and vinyl acetate which can be prepared by the reaction between polyvinyl alcohol and aldehyde and the characteristic changes according to variation of these compositions. So in view of some properties such as solubility, adhesion and the like, it is preferable that the composition of the polyvinyl acetal resin is within the range as mentioned above. Further, R represents a lower alkyl group, especially an alkyl group having 1 to 8 carbon atoms, most preferably 1 to 4 carbon atoms.

Preferred degree of polymerization of the polyvinyl acetal resin is in the range from 100 to 3000, more preferably from 150 to 2000 in view of softening point and others. Still further, a mixture of the polyvinyl acetal resins and one or more resins which have good compatibility with the polyvinyl acetal resin may be employed. These resins include, for example, a phenol resin, a melamine resin, an epoxy resin, a maleic resin, an alkyd resin, a sulfurylamide resin, a nitrocellulose, and the like. In that case, it is preferable that the amount of the polyvinyl acetal resin is more than 40% by weight, more preferably, more than 60% by weight. The polyvinyl acetal resin as the binder can be used for not only a radiation image storage panel which has a honeycomb structure but also general radiation storage panel which does not have any honeycomb structure. Generally, such a binder may be employed in an amount of 0.01 to 1 part by weight based on 1 part by weight of the stimulable phosphor. However, in view of the sensitivity and sharpness of the radiation image storage panel obtained, the binder should preferably be employed in an amount as small as possible, more preferably within the range from 0.03 to 0.2 part by weight when taking also easiness in coating into account.

Further, in the radiation image storage panel of this invention, a protective film is generally provided on the surface exposed outside of the phosphor layer (the surface not shielded by the bottom portion of the phosphor layer substrate) for protecting physically and chemically the phosphor layer. The protective film may be formed by coating on the phosphor layer directly with a coating solution for protective film, or alternatively a protective film separately formed may be adhered onto the phosphor layer. The material for the protective film may be a conventional material for protective film such as nitrocellulose, ethyl cellulose, cellulose acetate, polyester such as polyethyleneterephthalate, etc.

When the protective film transmits the stimulated emission and irradiation of excitation ray is practiced from the protective film side, those which can transmit excitation ray may be selected from the materials as mentioned above.

The radiation image storage panel of this invention can give images having sharpness when employed in the radiation image storage process as schematically illustrated in FIG. 8.

To describe in detail, in FIG. 8, 16 is a radiation generating device, 17 is an object to be photographed, 18 is the radiation image storage panel of this invention, 19 is an excitation ray source for permitting the latent radiation image on the radiation image storage panel to be radiated as luminescence, 20 is a photoelectric transducer for detection of the photoelectricity radiated from the radiation image storage panel, 21 is an image reproducing device for reproducing the photoelectric transducing signals detected at the photoelectric transducer 20, 22 is an image display device for displaying images reproduced, 23 is a filter which cuts the reflected light from the light source 19 and permits only the light radiated from the radiation image storage panel 18 to transmit therethrough. The photoelectric transducer 20 through the image display device 22 may be any desired system which can reproduce the optical information from the radiation image storage panel 18 as an image in some form, and they are not limited to those as described above.

For cutting of the reflected light from the light source, in place of using a filter, it is also possible to use the method as disclosed in Japanese Patent Application No. 124744/1982, wherein delay in emission is utilized for separation of the lights.

As shown in FIG. 8, when a radiation is irradiated with an object to be photographed disposed between the radiation generating device 16 and the radiation image storage panel 18, the radiation will transmit through the object to be photographed 17 corresponding to the transmissivity at the respective portions, and the transmitted image (namely the image with strong and weak radiations) will be incident on the radiation image storage panel 18. The incident transmitted image is absorbed by the phorphor layer in the radiation image storage panel 18, whereby electrons and/or positive holes in numbers in proportion to the dosage of radiation absorbed within the phosphor layer will be generated and stored at the trap level of the phosphor. In other words, stimulable image (latent image) of the transmitted radiation image is formed.

Next, this latent image is excited with an excitation ray to be radiated as the stimulated emission, thus effecting visualization. Since the phosphor layer in the radiation image storage panel 18 is divided into a number of cells with a partitioning wall member, spreading of the excitation ray within the phosphor layer is suppressed during excitation of the above phosphor layer. Intensity of the luminescence radiated is in proportion to the number of electrons and/or positive holes stored, namely in proportion to the intensity of the radiation energy absorbed in the phosphor layer in the radiation image storage panel 18, and this optical signal is transduced into an electrical signal by a photoelectric transducer 20 such as a photomultiplier tube, which electrical signal is reproduced as an image by means of the image reproducing device 21 and the image is displayed by the image display device 22.

The method for preparation of the substrate constituted of the bottom portion and the partitioning member may be constituted either of the preparation method in which the above honeycomb structure is formed with the use of a mother mold (mold casting method) or of the preparation method in which the honeycomb structure is formed by etching of a substrate (etching method).

In the aforesaid mold casting method, a large amount of substrates having the honeycomb structure can be prepared repeatedly at low cost and rapidly from one mother mold. On the other hand, according to the etching method, by utilization of photographic processes and others, honeycomb structures of precise and free shapes can be prepared, and there is no great limitation to the substrate materials.

According to the mold casting method as described above, first a mother mold 24 is prepared as shown in FIG. 9 in a form conjugated with the phosphor layer substrate as shown in FIG. 1. This mother mold is prepared by forming grooves having a width $W_2$ and depth $h_4$ slightly greater than those of $W_1$ and $h_1$ shown in FIG. 1 with a diamond blade on the surface of a flat plate comprising a silicon crystal material. Then, a molding material is casted into the mother mold. This molding material may preferably a material, such as a white silicone rubber mixed with titanium oxide as the pigment, which transmits substantially no excitation ray through the partitioning wall after finishing, and can be molded with good flowability, excellent mold release property and small shrinkage. After the molding material is solidified, it is released from the mother mold to obtain a phosphor layer substrate as shown in FIG. 1. By filling the respective cells on this substrate with a phosphor, the radiation image storage panel of this invention can be prepared.

Next, according to the etching method, when, for example, a photosensitive plate is used, a mask of which opaque portions to light have an island-like pattern is closely contacted on the surface of a nylon photosensitive resin (e.g. Printite, produced by Toyo Boseki Co., Ltd.) and UV-ray including the wavelengths within a photosensitive wavelength region of 250 to 400 nm is irradiated thereon. After light exposure, the photosensitive resin is developed. By this development, the non-exposed portions in the case of the above photosensitive resin are flown away, whereby the phosphor layer substrate 25 is formed as shown in FIG. 10. By filling the cells framed by this substrate 25 with a phosphor, the radiation image storage panel can be prepared. Also, in this case, since the photosensitive resins are generally transparent, a light-absorbing material or a light-reflective material 26 is provided on the inner surface of the partitioning walls of the cells by coating or vapor deposition as shown in FIG. 11.

Further, the preparation method employing etching of a metal plate is now explained. First, on both surfaces of, for example, a nickel plate, a photosensitive resin AZ-1350 commercially available from Sippley Co. is evenly coated. Then, masks having an island-like pattern of the light transmitting portion is closely contacted on both surfaces of the above nickel plate so that the patterns on both surfaces may correspond to each other, and subjected to exposure with UV-ray. After exposure, the photosensitive resin is developed, whereby the exposed portions of the above photosensitive resin are flown away. Subsequently, after the nickel plate is baked at 120° C. for 30 minutes, the nickel plate is etched with an acid to form a partitioning wall member 27 as shown in FIG. 12. The partitioning wall member 27 is adhered to the bottom portion of, for example, polyethylene terephthalate 28, to form a phosphor layer substrate. By filling the cells (on the substrate) with a phosphor, the radiation image storage panel can be prepared.

As described above, the radiation image storage panel, wherein the phosphor layer are divided into a number of parts by partitioning wall members and the excitation ray can be suppressed from spreading within the phosphor layers, can give images of markedly improved sharpness, and therefore it is of very high commercial value.

This invention is further illustrated by referring to the following Examples.

EXAMPLE 1

On the surface of a nylon photosensitive resin (Printite, produced by Toyo Boseki Co., Ltd.) was closely contacted a mask having an island-like pattern of the non-transmissive portion, followed by exposure to UV-ray for one minute. After exposure, the photosensitive resin was devloped with water to prepare a phosphor layer substrate as shown in FIG. 10. The cells on this substrate had dimensions of $d_1=d_2=100$ μm, and $h_1=200$ μm and a thickness of the partitioning wall of $W_1=40$ μm and $W_3=70$ μm. An aluminum layer with a reflectance of 80% was also deposited on the inner walls of the cells by vapor deposition (under vacuum of $2\times 10^{-5}$ Torr under heating).

As the next step, 8 parts by weight of BaFBr:Eu phosphor with a mean grain size of 2 μm and 1 part by weight of a polyvinyl butyral (binder) were mixed and dispersed with the use of a solvent (cyclohexanone) to prepare a coating solution. This coating solution was applied evenly on the above phosphor layer substrate horizontally placed to fill the respective cells with the phosphor, and the coated substrate was left to stand overnight to prepare a radiation image storage panel A.

Separately, the above procedure was repeated except that the above coating solution was applied to a dry film thickness of 200 μm on a polyethylene terephthalate film horizontally placed without using the above phosphor layer substrate to obtain a radiation image storage panel B for Control.

Separately, a panel B′ for control was obtained by the same procedure as the panel B except that as a substrate Printite having the same aluminum layer as the panel A thereon is used instead of the polyethylene terephthalate film.

Then, the above radiation image storage panels A, B and B′ were each irradiated with an X-ray of a tube voltage of 80 KVp, scanned with a He-Ne laser beam of 150 μm φ to excite the phosphor, the emission from the phosphor was received by means of a light receiving means (photomultiplier tube) to be converted into electrical signals, followed by reproduction thereof into images by means of an image reproducing device, which were then displayed on a display device. The modulation transmission functions (MTF) for the respective images were examined. The results are shown in Table 1.

TABLE 1

| Panel | Spatial frequency (LP/mm) | | | | | | | |
|---|---|---|---|---|---|---|---|---|
| | 0 | 0.5 | 1 | 1.5 | 2 | 2.5 | 3 | 4 |
| A | 100(%) | 95 | 90 | 81 | 72 | 66 | 58 | 26 |
| B | 100 | 90 | 61 | 43 | 30 | 24 | 17 | 6 |
| B' | 100 | 86 | 56 | 38 | 25 | 20 | 12 | 3 |

As apparently seen from the above Table 1, the radiation image storage panel A having the phosphor layer divided gives images of extremely high sharpness as compared with the radiation image storage panel B or B' of the prior art.

EXAMPLE 2

By etching a nickel plate and contacting the etched nickel plate to a polyethylene terephthalate film, a phosphor layer substrate as shown in FIG. 12 was prepared. The cells on this substrate had dimensions of $d_1=d_2=120$ μm, $h_1=190$ μm and a thickness of the partitioning wall at its minimum of 35 μm. Subsequently, a coating solution was prepared in the same manner as in Example 1 by use of a 0.1YF$_3$.0.9BaFBr:Eu phosphor in place of the BaFBr:Eu phosphor of Example 1, followed by coating and drying similarly as in Example 1, to prepare a radiation image storage panel C.

On the other hand, separately, the above procedure was repeated except that the above coating solution was applied to a dry film thickness of 190 μm on a polyethylene terephthalate film horizontally placed without using the above phosphor layer substrate to obtain a radiation image storage panel D for Control. MTF values of the images obtained by storage the radiation images similarly as in Example 1 are shown in Table 2 below.

TABLE 2

| Panel | Spatial frequency (LP/mm) | | | | | | | |
|---|---|---|---|---|---|---|---|---|
| | 0 | 0.5 | 1 | 1.5 | 2 | 2.5 | 3 | 4 |
| C | 100(%) | 96 | 92 | 84 | 75 | 67 | 60 | 30 |
| D | 100 | 92 | 63 | 41 | 30 | 26 | 18 | 7 |

As apparently seen from the above Table 2, the radiation image storage panel C having the phosphor layer divided gives images of extremely high sharpness as compared with the radiation image storage panel D of the prior art.

As the effect of the present invention, simultaneously with accomplishment of the object of this invention, a general method for improvement of sharpness in the radiation image storage method employing a stimulable phosphor could be provided, thus contributing to the progress of this technical field.

We claim:

1. A method for radiophotography, comprising:
   transmitting radiation energy through an object to be photographed to produce a transmitted radiation image;
   absorbing and storing the transmitted radiation image in a light-stimulable radiation image storage panel which comprises:
   a honeycomb structure comprising partition members arranged to define a plurality of adjacent but separated cells arranged in a honeycomb manner, each of said cells being separated from adjacent cells by said partition members; and
   a light-stimulable phosphor in said respective cells of said honeycomb structure, said light stimulable phosphor producing a stimulated emission when irradiated or stimulated by a laser exciting light having a wavelength of from about 500 to about 800 nm, impinging thereon after said radiation image is stored in said image storage panel, said partition member of an excited cell substantially preventing scattering or spreading of the exciting light so as to substantially prevent the exciting light from impinging on the light-stimulable phosphors located outside the confines of the respective cell containing said excited or stimulated phosphor;
   exciting the stored image in said storage panel by stimulating the phosphor with a scanning laser light scanning over the surface of the panel to permit the radiation energy stored in the stimulable phosphor in said cells of said honeycomb structure to be radiated as luminescence; and then
   detecting radiated luminescence from said cells of said honeycomb structure in synchronization with said scanning of said laser light, and displaying the radiation image corresponding to the detected radiated luminescence.

2. The method of claim 1, wherein said honeycomb structure comprises a substrate which includes a bottom member and said partition members extending upwardly relative to said bottom member.

3. The method of claim 2, wherein said bottom member is connected to said partition members which extend upwardly therefrom.

4. The method of claim 1, wherein, at the top surface of said panel, ratio of cell area to the area of said partition members if 50% or more.

5. The method of claim 1, wherein the depth of said cells is from about 30 μm to about 1000 μm.

6. The method of claim 1, wherein said partition members have a thickness of from about 10 to about 300 μm.

7. The method of claim 1, wherein said partition members have upper surfaces, and said stimulable phosphor in said cells have upper surfaces which are on the same level as said upper surfaces of said partition members.

8. The method of claim 1, further comprising a protective film on the outer exposed surface of said stimulable phosphor.

9. The method of claim 1, wherein said stimulable phosphor has a mean grain size of 1 to 30 μm.

10. The method of claim 1, wherein said partition members are absorptive to said exciting light.

11. The method of claim 1, wherein said partition members are reflective to said exciting light.

12. The method of claim 1, wherein said stimulable phosphor is dispersed in a binder.

13. The method of claim 1, wherein said cells are substantially square in cross-section.

14. The method of claim 1, wherein said cells are substantially circular in cross-section.

15. The method of claim 1, wherein said cells are substantially hexagonal in cross-section.

16. The method of claim 1, wherein said partition members are made of a metal material.

17. The method of claim 1, wherein the radiation energy is X-ray radiation energy.

18. The method of claim 1, wherein said light-stimulable phosphor is a phosphor selected from the group consisting of: earth fluorohalide phosphor of the formula: $(Ba_{1-x-y}Mg_xCa_y)FX:eEu^{2+}$ (where X is at least one of Br and Cl, x, y and e are numbers satisfying the conditions of $0<x+y\leq0.6$, $xy\neq0$ and $10^{-6}\leq e\leq5\times10^{-2}$, respectively); a phosphor of the formula: LnOX:xA (where Ln represents at least one of La, Y, Gd and Lu, X represents Cl and/or Br, A represents Ce and/or Tb, and x represents a number staifying $0<x<0.1$); a phosphor of the formula: $(Ba_{1-x}M^{II}x)FX:yA$ (where $M^{II}$ represents at least one of Ma, Ca, Sr, Zn and Cd, X represents at least one of Cl, Br and I, A represents at least one of Eu, Tb, Ce, Tm, Dy, Pr, Ho, Nd, Yb and Er, x and y are numbers satisfying the conditions of $0\leq x\leq0.6$ and $0\leq y\leq0.6$); a phosphor of the formula: BaFX,xCe,yA (where X is at least one of Cl, Br and I, A is at least one of In, Tl, Gd, Sm and Zr, x and y are $0<x\leq2\times10^{-1}$ and $0<y\leq5\times10^{-2}$, respectively); a phosphor of divalent metal fluorohalide activated with a rare earth element of the formula: $M^{II}FX:xA:yLn$ (where $M^{II}$ is at least one kind of Ba, Ca, Sr, Mg, Zn and Cd, A is at least one kind of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, Ln is at least one of Eu, Tb, Ce, Tm, Dy, Pr, Ho, Nd, Yb, Er, Sm and Gd, X is at least one of Cl, Br and I, x and y are numbers satisfying the conditions of $5\times10^{-5}\leq x\leq0.5$ and $0<y\leq0.2$);

$$xM_3(PO_4)_2 \cdot NX_2:yA \qquad \text{Formula [I]}$$

$$M_3(PO_4)_2:yA \qquad \text{Formula [II]}$$

(wherein M and N each represents at least one kind of Mg, Ca, Sr, Ba, Zn and Cd, X represents at least one kind of F, Cl, Br and I, A represents at least one kind of Eu, Tb, Ce, Tm, Dy, Pr, He, Nd, Yb, Er, Sb, Tl, Mn and Sn, and x and y are numbers satisfying $0<x\leq6$ and $0\leq y\leq1$, respectively); and a phosphor of the formula [III] or [IV]:

$$nReX_3 \cdot mAX_2':xEu \qquad \text{Formula [III]}$$

$$nReX_3 \cdot mAX_2':xEu \cdot ySm \qquad \text{Formula [IV]}$$

(wherein Re represents at least one kind of La, Gd, Y and Lu, A represents at least one kind of alkaline earth metals, Ba, Sr and Ca, X and X' represent at least one kind of F, Cl and Br, x and y are numbers satisfying the Conditions of $1\times10^{-4}<x<3\times10^{-1}$, $1\times10^{-4}<y<1\times10^{-1}$, and n/m satisfies the condition of $1\times10^{-3}<n/m<7\times10^{-1}$).

19. The method of claim 1, comprising exciting said stored image in said storage panel by a He-Ne laser light.

20. The method of claim 1, wherein said honeycomb structure is a non-metallic structure.

* * * * *